(12) United States Patent
Kobilarov

(10) Patent No.: US 10,671,075 B1
(45) Date of Patent: Jun. 2, 2020

(54) TRAJECTORY GENERATION USING CURVATURE SEGMENTS

(71) Applicant: Zoox, Inc., Menlo Park, CA (US)

(72) Inventor: Marin Kobilarov, Mountain View, CA (US)

(73) Assignee: Zoox, Inc., Foster City, CA (US)

( * ) Notice: Subject to any disclaimer, the term of this patent is extended or adjusted under 35 U.S.C. 154(b) by 318 days.

(21) Appl. No.: 15/843,512

(22) Filed: Dec. 15, 2017

(51) Int. Cl.
  *G05D 1/02* (2020.01)
  *G05D 1/00* (2006.01)
  *G01C 21/34* (2006.01)
  *G06K 9/00* (2006.01)

(52) U.S. Cl.
  CPC .......... *G05D 1/0212* (2013.01); *G01C 21/34* (2013.01); *G05D 1/0088* (2013.01); *G06K 9/00791* (2013.01); *G05D 2201/0213* (2013.01)

(58) Field of Classification Search
  CPC ............... G05D 1/0212; G05D 1/0088; G05D 2201/0213; G01C 21/34; G06K 9/00791
  USPC .......................................................... 701/23
  See application file for complete search history.

(56) References Cited

U.S. PATENT DOCUMENTS

| | | | | |
|---|---|---|---|---|
| 8,504,175 B2* | 8/2013 | Pekar | ................... | G05B 13/048 700/29 |
| 2014/0214265 A1* | 7/2014 | Ashton | ................... | G06F 17/00 701/33.5 |
| 2017/0140540 A1* | 5/2017 | Yamamoto | .......... | G05D 1/0251 |
| 2018/0345963 A1* | 12/2018 | Maura | ................ | G06K 9/00798 |
| 2019/0235513 A1* | 8/2019 | Li | ........................ | G05D 1/0219 |
| 2019/0243370 A1* | 8/2019 | Li | ....................... | B60W 30/095 |
| 2019/0346845 A1* | 11/2019 | Rottkamp | ............. | B60W 30/12 |

* cited by examiner

*Primary Examiner* — Paula L Schneider

(74) *Attorney, Agent, or Firm* — Lee & Hayes, P.C.

(57) ABSTRACT

A trajectory for an autonomous vehicle (AV) can be generated using curvature segments. A decision planner component can receive a reference trajectory for the AV to follow in an environment. A number of subdivisions (frames) of the reference trajectory may be associated with a curvature value and a tangent vector. Starting with an initial position of the AV, a candidate trajectory can be determined by continuously intersecting a segment with an origin at the initial position of the AV and a reference line associated with a particular frame. The reference line can be substantially perpendicular to the tangent vector of the particular frame. A location of the intersection between the segment and the reference line can be based on a curvature value of the segment. Optimizing a candidate trajectory can include varying curvature values associated with various segments and determining costs of the various candidate trajectories.

20 Claims, 8 Drawing Sheets

TRAJECTORY GENERATION USING CURVATURE SEGMENTS

BACKGROUND

Various methods, apparatuses, and systems are utilized by autonomous vehicles to guide such autonomous vehicles through environments including various static and dynamic objects. For instance, autonomous vehicles utilize route planning methods, apparatuses, and systems to guide autonomous vehicles through congested areas with other moving vehicles (autonomous or otherwise), moving people, stationary buildings, etc. In some examples, generating routes for an autonomous vehicle can be computationally intensive or can provide inaccurate results in order to ensure a route can be generated within a period of time.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
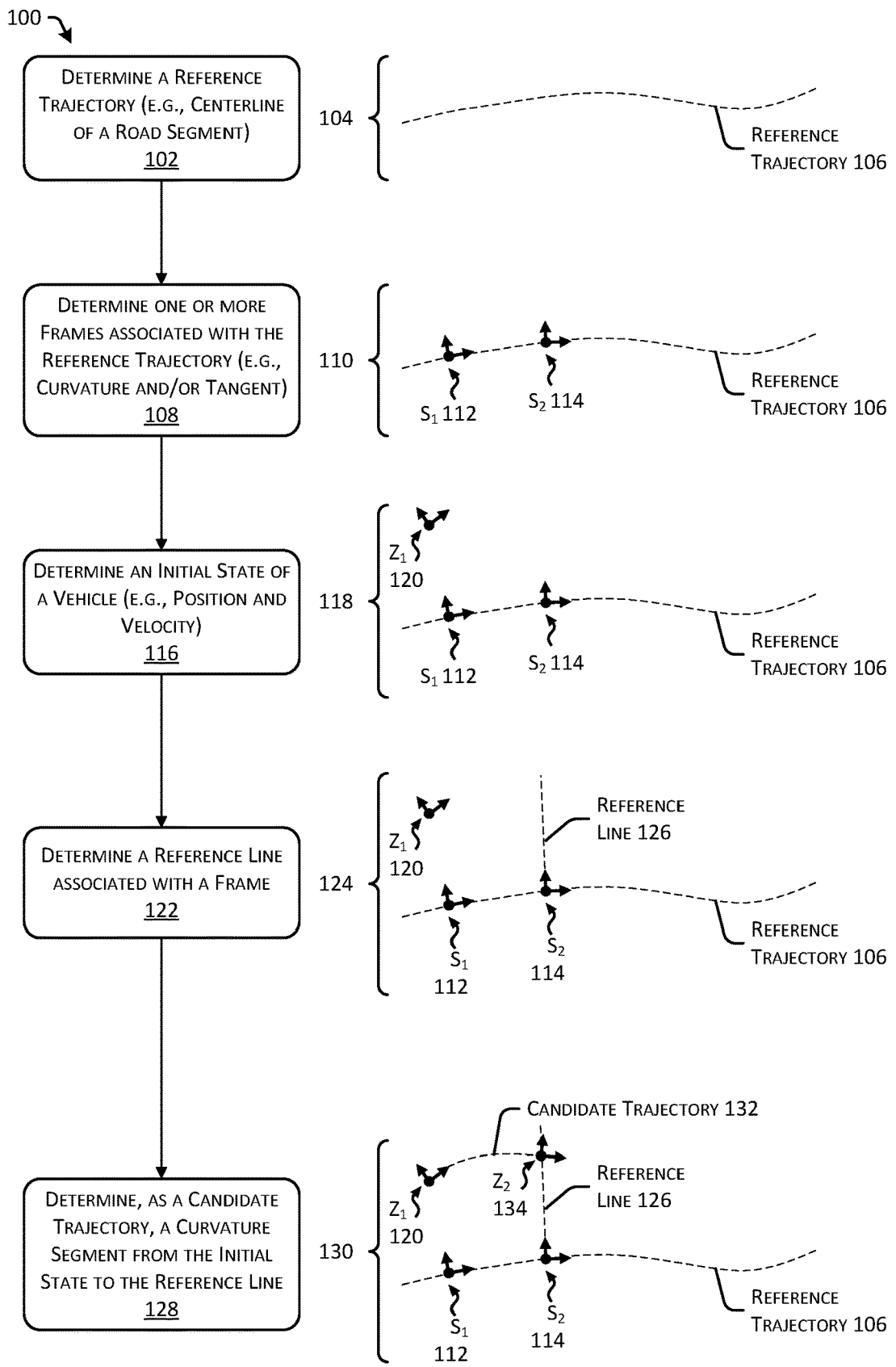
FIG. 1 illustrates a pictorial flow diagram of an example process for determining a candidate trajectory for an autonomous vehicle based on curvature segments and frames associated with a reference trajectory, in accordance with embodiments of the disclosure.

This disclosure describes methods, apparatuses, and systems for determining a trajectory for an autonomous vehicle using curvature segments. In some instances, a decision planner component of an autonomous vehicle, for example, can receive a reference trajectory, which may correspond to an ideal trajectory for an autonomous vehicle to traverse through an environment, such as a center of a road segment. Despite planning such an ideal trajectory, various factors may cause the autonomous vehicle to travel in a trajectory that deviates from the ideal trajectory (e.g., limitations of modeling, drift in sensors, limitations in actuators, changes in an environment, etc.). As a non-limiting example, a reference trajectory may simply indicate to the vehicle to continue driving straight down a road, while the vehicle must actually compensate for avoiding potholes, other drivers encroaching on a lane, and a drift in GPS signal. In order to plan such a compensation, an initial position of the autonomous vehicle (also referred to as a vehicle or robot) can be determined relative to the reference (or ideal) trajectory, including, for example, a lateral offset from the reference trajectory to a point of the vehicle, as well as an angular offset (e.g., a measure of the heading of the vehicle relative to a tangent in the reference trajectory). In addition to the initial position, an acceleration and a steering angle rate of the vehicle can be determined.

In order to return to, or more closely follow, the reference trajectory, the vehicle can follow a revised trajectory. Such a revised trajectory may be determined based on evaluating a cost of multiple candidate trajectories. Such costs may be computed by integrating the candidate trajectory as described herein. Because the candidate trajectories are required to continue operating the vehicle, they should be evaluated quickly. Integrating the candidate trajectories according the description herein may significantly outperform other methods of integration, both in time and in accuracy. For example, prior art techniques relying on constrained nonlinear programming methods based on a numerical approximation of vehicle dynamics can suffer from a lack of convergence and/or can be slow, often requiring 10 milliseconds to return a result. In contrast, the techniques discussed herein can guarantee convergence and can provide a result in less than 1 millisecond. In some instances, the techniques discussed herein can generate a revised trajectory by computing a trajectory using piecewise geometry to determine a closed-form analytical solution.

The reference trajectory can be divided into discrete portions and represented as frames, a frame corresponding to equally-spaced points on the reference trajectory and associated with a tangent vector and a curvature value associated with the point of the particular frame of the reference trajectory. Next, a reference line that is perpendicular to the tangent vector of a particular frame can be determined. Such a reference line may be used as a form of integration as a candidate trajectory can be propagated (or otherwise evolved in time) by intersecting a curved segment of the candidate trajectory with the reference line. An intersection point between the curved segment and the reference line becomes an origin for a next segment that spans from the intersection point to a reference line corresponding to the next frame. Repeating the operation provides a numeric form of geometric integration.

A candidate trajectory can comprise a plurality of segments spanning from an initial point (or a reference line) to a next reference line. Each segment can be defined, at least in part, by a curvature associated with the particular segment and a position relative to the reference trajectory. Further, the vehicle may also have a varying acceleration, velocity, steering angle, or steering angle rate at every point. One or more costs or constraints can be determined for a candidate trajectory. These constraints may be defined based on the geometry of the segment. For example, it may not be physically possible for one segment to have a large positive curvature curve and the next segment to have a large negative curvature. As such, one constraint may be to enforce continuity between segments. Further constraints include considering the steering angle of one segment and the curvature of the next.

In some instances, the candidate trajectory can be perturbed, which can correspond to varying curvature values of one or more segments in the candidate trajectory, thereby generating a revised trajectory. In some instances, the candidate trajectory can be perturbed based at least in part on a gradient descent algorithm or a projected-Newton method. As can be understood, varying a curvature of a segment can change an intersection point on a reference line between the segment and the reference line. Revised costs can be determined for the revised candidate trajectory, and a candidate trajectory can be selected based at least on the determined costs. Thus, in this manner, the candidate trajectories can be perturbed and revised costs can be determined to output a candidate trajectory optimized for the various costs, as discussed herein.

In some instances, individual segments forming the candidate trajectory can represent segments having a constant curvature. Thus, for each segment, it can be assumed that inputs to a vehicle are not changed, such that an accurate trajectory of the vehicle motion can be determined. Further, because the segments can be determined, at least in part, using geometry, for example, the processing can be performed rapidly and can converge at an optimal solution, sometimes only requiring one or two iterations to determine an optimum.

In some instances, the decision planner component of the autonomous vehicle can consider multiple actions that the autonomous vehicle can perform. In an example where the autonomous vehicle is driving in a center lane of a multi-lane road, example actions of the autonomous vehicle can include driving in the center lane, switching to a left lane, or switching to a right lane. For each action (e.g., driving in the center, left, or right), the planner component can determine a candidate trajectory. The candidate trajectories can be included as instances of a search tree, and processing can include selecting an action based at least in part on costs associated with the individual action. In some instances, selecting an action can be based at least in part on simulating the vehicle dynamics with respect to each candidate trajectory. Thus, the operations discussed herein can facilitate selecting individual actions, as well as selecting individual trajectories from a plurality of trajectories (e.g., corresponding to the same action).

In some instances, temporal logic can be used to determine a validity of one or more of the candidate trajectories. For example, in some instances, a planner component of an autonomous vehicle can determine temporal logic formulas (e.g., linear temporal logic, signal temporal logic, etc.) based on static symbols and dynamic symbols representing various objects in an environment. The candidate trajectory can be evaluated with respect to the temporal logic formulas to determine if the trajectory is "valid" based on the symbols present in an environment (e.g., a stop sign) and the behavior of the vehicle represented by the candidate trajectory (e.g., stopping or not stopping at the stop sign). Additional details of utilizing temporal logic for a decision planner are discussed in a related application with Ser. No. 15/632,147, which is incorporated by reference herein, in its entirety.

The trajectory generation techniques described herein can improve a functioning of a computing device by providing a robust mechanism for determining a trajectory using curvature segments. For example, in some instances, the techniques used herein can provide a closed-form evolution of vehicle dynamics based at least in part on a reference trajectory and a relative coordinate transformation. In some instances, a candidate trajectory can be initialized using a straight-line segment or a curvature associated with a corresponding frame of the reference trajectory for efficient convergence to an optimal candidate trajectory. Further, in some instances, a planner component can explore various trajectories and/or actions in parallel, leading towards optimal outcomes in terms of autonomous vehicle control. In some instances, the trajectory generation discussed herein can be performed more accurately, may require less processing power, and/or may require less memory than conventional trajectory generation techniques, such as constrained nonlinear programming methods or an approximate linear system. These and other improvements to the functioning of the computer are discussed herein.

The methods, apparatuses, and systems described herein can be implemented in a number of ways. Example implementations are provided below with reference to the following figures. Although discussed in the context of an autonomous vehicle, the methods, apparatuses, and systems described herein can be applied to a variety of systems using route planning and/or trajectory generation, and is not limited to autonomous vehicles. In another example, the methods, apparatuses, and systems may be utilized in an aviation or nautical context. Additionally, the techniques described herein may be used with real data (e.g., captured using sensor(s)), simulated data (e.g., generated by a simulator), or any combination of the two.

FIG. 1 illustrates a pictorial flow diagram 100 of an example process for determining a candidate trajectory for an autonomous vehicle based on curvature segments and frames associated with a reference trajectory, in accordance with embodiments of the disclosure.

At operation 102, the process can include determining a reference trajectory 106 for an autonomous vehicle to follow (e.g., traverse) in an environment. In some instances, the reference trajectory 106 can correspond to a centerline of a road segment. The reference trajectory 106 can be generated by a decision planner component (discussed below in connection with FIG. 5) at least partially in response to high-level mission requirements associated with a route, such as instructions for a vehicle to navigate to from point A to point B. As illustrated in an example 104, a reference trajectory 106 can correspond to any shape or path navigable by a vehicle.

At operation 108, the process can include determining one or more frames associated with the reference trajectory. In some instances, the one or more frames can be determined at fixed intervals of distance with respect to the reference trajectory. In some instances, the one or more frames can be determined at fixed time intervals based on a velocity of the autonomous vehicle. In some instances, individual frames of the reference trajectory 106 can include information defining at least a portion of the reference trajectory, such as a curvature value and/or a tangent vector of a point on the reference trajectory. In an example 110, the reference trajectory 106 is illustrated with a first frame $S_1$ 112 and a second frame $S_2$ 114. In some instances, the reference trajectory 106 can include any number of frames, and in some instances, a number of frames can be based at least in part on a distance of a receding horizon and a distance between frames within the receding horizon. For example, the receding horizon may be on the order of 50 meters and individual frames can be spaced on the order of every 25 centimeters, although any distances are contemplated herein. In some examples, the receding horizon may be based on a period of time for a vehicle to travel. In some instances, frames can be spaced at any regular or irregular intervals of time, space, curvature, etc.

The first frame 112 and the second frame 114 can provide a representation of the reference trajectory 106 at points along the reference trajectory 106. For example, the first frame 112 can include a curvature value of the reference trajectory 106 at a portion before the first frame 112, at a discrete point representing the first frame 112, and/or a portion following the first frame 112 (e.g., between the first frame 112 and the second frame 114). Further, the first frame 112 can include a representation of a tangent vector corresponding to a point on the reference trajectory 106. In some instances, the first frame 112 can include information associated with a road surface, such as surface material (e.g., gravel, asphalt, concrete, metal), coefficient of friction, a measure of surface irregularities (e.g., potholes, etc.), temperature, weather conditions, speed limits, and the like. As can be understood, the second frame 114 can be associated with a curvature value and tangent vector associated with a second point on the reference trajectory 106, as well as any additional information, as discussed herein.

The operation 116 can include determining an initial state of a vehicle, such as an autonomous vehicle. In some instances, the initial state of the vehicle can include, but is not limited to, a position of the vehicle (e.g., in a coordinate system relative to the reference trajectory 106, etc.), a velocity of the vehicle, and the like. In an example 118, an initial state $Z_1$ 120 represents a location of the autonomous vehicle, for example, at an instant corresponding to the first frame 112. That is, the initial state 120 can correspond to the first frame 112, such that the first frame 112 represents where the vehicle ideally should be, while the initial state 120 represents where the vehicle actually is at a time or location associated with the first frame 112.

The initial state 120 can further include information such as, but not limited to, a steering angle, a steering angle rate of change, a direction of the vehicle (e.g., a yaw angle), a yaw rate, resources of the vehicle (e.g., fuel (gasoline, diesel, etc.) or energy (e.g., electrical energy, battery level, etc.), occupancy (e.g., passengers, cargo, etc.), mechanical state (e.g., odometer value, turning restrictions, suspension status, and the like), passenger preferences (e.g., preference for a smooth ride, preference for a fast ride, etc.), and the like. In some instances, aspects of the initial state 120 can be determined by a localization component of the autonomous vehicle.

At operation 122, the process can include determining a reference line associated with a frame. As shown in an example 124, a reference line 126 can extend from the reference trajectory 106 in a direction that is substantially perpendicular to the tangent vector associated with the second frame 114. In some instances, a direction of the reference line 126 may vary, and need not be constrained by or be associated with the tangent vector of the second frame 114.

At operation 128, the process can include determining, as a candidate trajectory, a curvature segment from the initial state to the reference line. In an example 130, a candidate trajectory 132 is shown originating at the initial state 120 and intersecting with the reference line 126 at an intersection point that corresponds to a second state 134. As can be understood, a location of the intersection point (and accordingly, a location of the second state 134) can be based at least in part on a curvature value associated with the candidate trajectory 132. For example, various curvature values may result in a candidate trajectory with an intersection point on the reference line 126 that is higher or lower that the intersection point as illustrated in FIG. 1.

In some instances, a curvature value for a curvature segment can be initialized based at least in part on a curvature value of the associated frame. For example, for the curvature segment corresponding to the candidate trajectory 132, the curvature value can correspond to the curvature value associated with the first frame 112. In some instances, a curvature value can be initialized as a straight-line segment. In some instances, a curvature value can be bounded or constrained to ensure that a curvature segment with an origin corresponding to the initial state 120 intersects with the reference line 126 (instead of spiraling away from the reference line 126 without ever intersecting with the reference line 126). In some instances, the curvature value can be based at least in part on curvature value(s) associated with adjacent frames (e.g., an average or weighted average of curvature values over a sliding window), thereby enforcing continuity.

As mentioned above, the candidate trajectory 132 can comprise a plurality of curvature segments associated with a plurality of frames. Further, as the candidate trajectory is extended from left to right (as illustrated in FIG. 1), an intersection point for a curvature segment becomes an origin point for a next segment, as discussed herein. In such a manner, the candidate trajectory 132 may be extended (or evolved in time) up to, for example, a receding horizon. As discussed in FIG. 2, and throughout this disclosure, one or more costs can be determined for a candidate trajectory. The curvature values can be varied (e.g., increased or decreased) to determine revised candidate trajectory, and revised costs can be determined based on the revised candidate trajectory.

Figure 2:
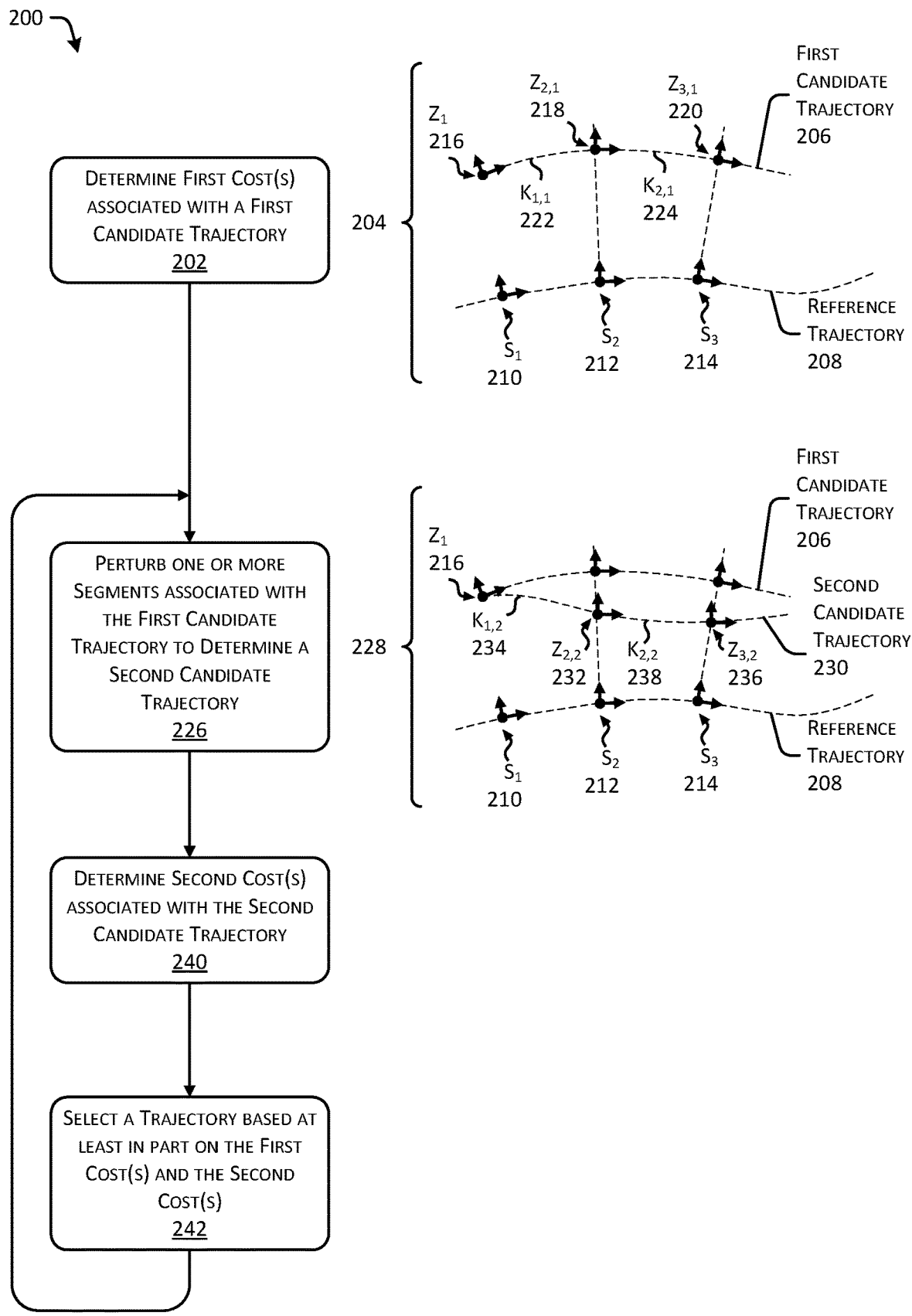
FIG. 2 illustrates a pictorial flow diagram of an example process for determining multiple candidate trajectories, determining costs associated with the multiple candidate trajectories, and selecting a trajectory, in accordance with embodiments of the disclosure.

FIG. 2 illustrates a pictorial flow diagram 200 of an example process for determining multiple candidate trajectories, determining costs associated with the multiple candidate trajectories, and selecting a trajectory, in accordance with embodiments of the disclosure.

At operation 202, the process can include determining first costs associated with a first candidate trajectory. In some instances, and without limitation, one or more costs associated with a candidate trajectory can be based at least in part on one or more of: a first distance from the autonomous vehicle to a corresponding frame on the reference trajectory; a second distance between the autonomous vehicle and an obstacle (or a pedestrian or another vehicle); an acceleration of the autonomous vehicle; a steering rate of change of the autonomous vehicle; a length of the candidate trajectory with respect to a length of the reference trajectory; comfort; performance; power consumption; a safety metric; obeying the rules of the road; or the like. For example, the one or more costs can be determined simultaneously for a candidate trajectory comprising a plurality of segments and can represent a summation or integration of some or all costs associated with the candidate trajectory.

An example 204 illustrates a first candidate trajectory 206 associated with a reference trajectory 208. In some instances, individual segments of the first candidate trajectory 206 can be generated using a process similar to that discussed above in connection with FIG. 1. As illustrated, the reference trajectory 208 includes frames 210, 212, and 214 (labeled as $S_1$, $S_2$, and $S_3$, respectively). An initial position 216 of a vehicle (e.g., an autonomous vehicle) is labeled as $Z_1$ (also referred to as a first state). The first candidate trajectory 206 further includes a second state 218 (e.g., $Z_{2,1}$ corresponding to the second state of the first candidate trajectory) and a third state 220 ($Z_{3,1}$). A first segment of the first candidate trajectory 206 between the first state (e.g., 216) and the second state (e.g., 218) can be associated with a curvature value $K_{1,1}$ 222, while a second segment between the second state 218 and the third state 220 can be associated with a curvature value $K_{2,1}$ 224.

As illustrated in the example 204, each segment of the first candidate trajectory 206 can be based at least in part on the preceding segments, for example. That is, a first segment can be defined by the initial position 216 of the vehicle and an intersection point (e.g., the second state $Z_{2,1}$ 218) with a reference line associated with the second frame 212, whereby the intersection point is based at least in part on the curvature value $K_{1,1}$ 222. The second segment can then be defined by the second state 218 and an intersection point (e.g., the third state 220) with a reference line associated with the third frame 214. Thus, the segments can build upon on one another to generate the first candidate trajectory 206. Of course, it can be understood that a trajectory can be generated from an origin to a destination (e.g., as illustrated in FIG. 1) or from a destination to an origin, or a combination of the two. Further, a segment for a candidate trajectory can be defined relative to an obstacle or other point, for example, without constraint to either end of the candidate trajectory.

At operation 226, the process can include perturbing one or more segments associated with the first candidate trajectory to determine a second candidate trajectory. In some instances, perturbing the candidate trajectory can be based at least in part on projected-Newton method (e.g., a projected stage-wise Newton method with nonlinear vehicle dynamics updated during a forward pass), a gradient descent algorithm, etc. In an example 228, a second candidate trajectory 230 is illustrated as representing a different trajectory from the first candidate trajectory 206. The second candidate trajectory 230 can be associated with the initial position (or first state) 216, but can include different curvature values, thereby establish a new trajectory. For example, a first segment of the second candidate trajectory 230 between the first state (e.g., 216) and a second state (e.g., $Z_{2,2}$ 232) can be associated with a curvature value $K_{1,2}$ 234, while a second segment of the second candidate trajectory 230 between the second state 232 and a third state (e.g., $Z_{3,2}$ 236) can be associated with a curvature value $K_{2,2}$ 238.

As can be understood, perturbing at least one curvature value (e.g., to ensure that a distance between an obstacle and the vehicle is at or above a minimum value) can cause a cascading effect to ripple through the second trajectory 230, thereby causing one or more additional variations in other curvature values for other segments.

At operation 240, the process can include determining second costs associated with the second candidate trajectory. In some instances, and without limitation, the one or more second costs associated with the second candidate trajectory 230 can be based at least in part on one or more of: a first distance from the autonomous vehicle to a corresponding frame on the reference trajectory 208; a second distance between the autonomous vehicle and an obstacle; an acceleration of the autonomous vehicle; a steering rate of change of the autonomous vehicle; a length of the candidate trajectory with respect to a length of the reference trajectory; comfort; performance; power consumption; a safety metric; obeying the rules of the road; or the like. For example, the one or more second costs can be determined simultaneously for a candidate trajectory comprising a plurality of segments and can represent a summation or integration of some or all costs associated with the second candidate trajectory 230.

At operation 242, the process can include selecting a trajectory based at least in part on the first costs and the second costs. In some examples, the operation 242 can include selecting a trajectory with the lowest costs. In some example, the operation 242 can include determining that the first and second costs are above a threshold value (e.g., indicating that the first and second candidate trajectories are not sufficiently optimized) and that a third candidate trajectory can be determined (illustrated by the iterative processing from the operation 242 to the operation 226). In some instances, the operation 242 can include simulating a selected trajectory with a more detailed model to confirm the costs determined in the operations, and in some instances, the operation 242 can include outputting the selected trajectory to a vehicle controller to control the operations of the autonomous vehicle.

Figure 3:
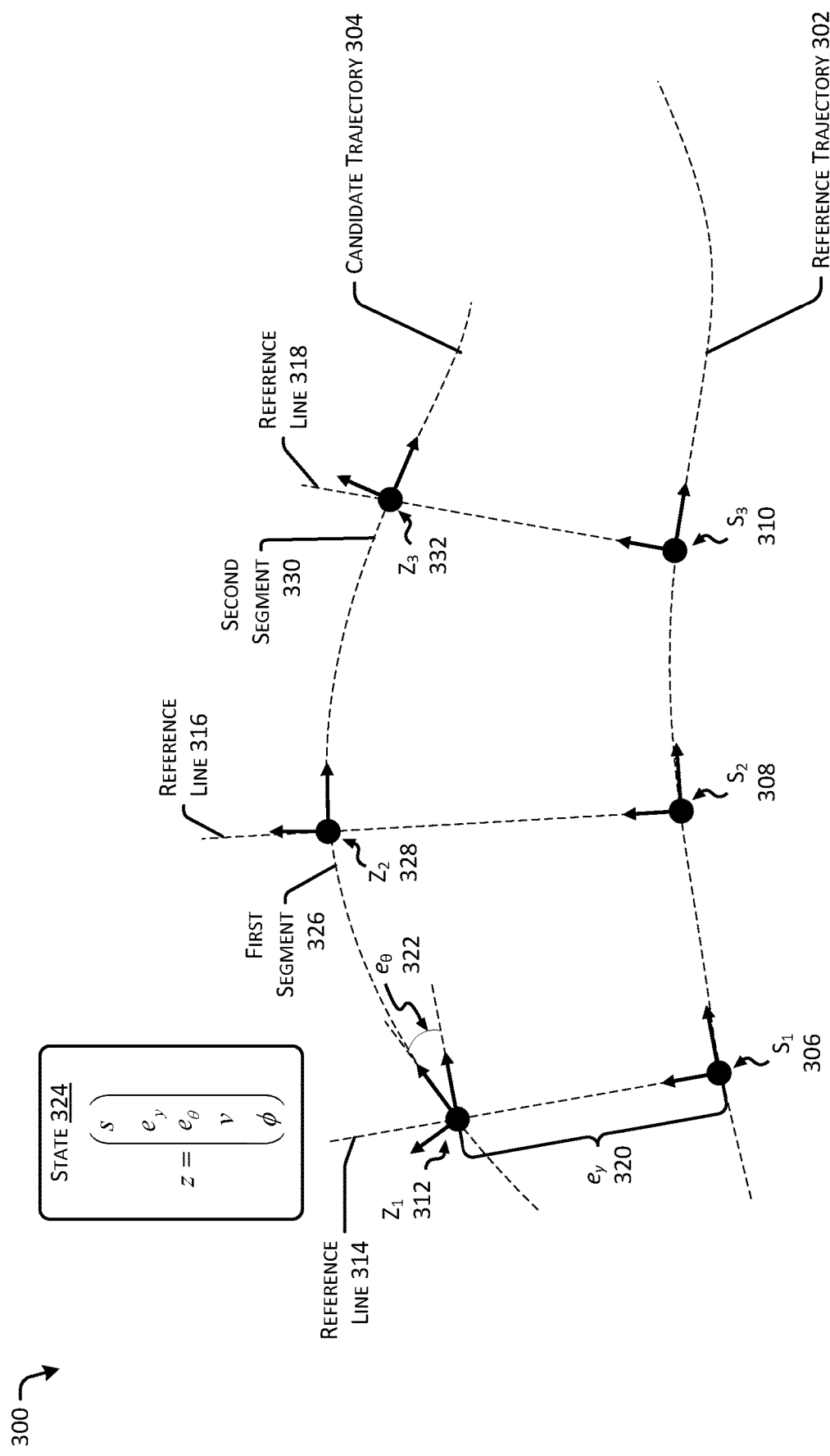
FIG. 3 depicts an example candidate trajectory including state information associated with an autonomous vehicle, in accordance with embodiments of the disclosure.

FIG. 3 depicts an example diagram 300 of a candidate trajectory including state information associated with an autonomous vehicle, in accordance with embodiments of the disclosure. As discussed above, a reference trajectory 302 may be provided to or generated by a decision planner component of an autonomous vehicle representing an idealized path for the autonomous vehicle to follow in an environment. Further, as discussed above, a candidate trajectory 304 can be generated based on the reference trajectory 302, whereby the candidate trajectory 304 can represent an actual path (or closer to the actual path) for the autonomous vehicle to follow.

As can be understood, a vehicle can be modeled in any level of abstraction. As illustrated in the example diagram 300, the vehicle can be modeled as a point. In some instances, a model of the vehicle can include, but is not limited to, a rigid body dynamics model, a vehicle model based on actual vehicle characteristics (e.g., friction, acceleration, length/width, etc.), and/or a simplified model whereby a vehicle is represented as a "bicycle" (e.g., a vehicle with four wheels is simplified as a motorcycle or bicycle).

The reference trajectory 302 can be associated with one or more frames 306, 308, and 310 (labeled as $S_1$, $S_2$, and $S_3$, respectively). As discussed above, individual frames can include information representing the reference trajectory 302, including but not limited to a curvature value associated with a point or a segment of the reference trajectory 302 and a tangent vector associated with a point or a segment of the reference trajectory 302.

An initial position 312 of the vehicle can correspond to an intersection between a reference line 314 associated with the first frame 306 of the reference trajectory 302 and a motion of the vehicle. In some examples, the reference line 314 can correspond to a line that is substantially perpendicular to a vector (e.g., a normal vector) that is tangent to a point representative of the first frame 306. In some instances, the location of the intersection between a motion of the vehicle and the reference line 314 can correspond to the initial position 312. The reference trajectory 302 can further be associated with reference lines 316 and 318 corresponding to the second and third frames (e.g., 308 and 310), as can be understood herein.

A plurality of data can be associated with each state of the candidate trajectory 304. For example, the initial state 312 of the vehicle can include a lateral offset 320 (e.g., $e_y$) representing a distance along the reference line 314 between the initial state 312 and the first frame 306.

Further, the initial state 312 can include an angle offset 322 (e.g., $e_\theta$), which can be defined as an angle between a current direction of travel of the vehicle and a direction associated with the reference trajectory of the first frame 306.

Additional details of the initial state 312 can be represented as a state 324 (e.g., Z), whereby Z can be represented as:

$$Z = \begin{pmatrix} s \\ e_y \\ e_\theta \\ v \\ \phi \end{pmatrix} \quad (1)$$

where s identifies an arc length along the reference trajectory, which in turn can be used to identify a particular frame (e.g., the first frame 306, the second frame 308, the third frame 310 . . . ), $e_y$ represents a lateral offset of the vehicle from the reference trajectory 302 at a particular frame, $e_\theta$ represents an angle offset between a vector associated with the reference trajectory 302 (e.g., a tangent vector) and a vector associated with the vehicle, v represents a velocity of the vehicle associated with a particular frame, and $\phi$ represents a steering angle of the vehicle associated with the particular frame.

Inputs to a vehicle can be represented a U, whereby U can be represented as:

$$U = \begin{pmatrix} a \\ \bullet \\ \dot{\phi} \end{pmatrix} \quad (2)$$

where a represents an acceleration of the vehicle, and $\dot{\phi}$ represents a steering angle rate of change.

A derivative of the state Z can be represented by the equation below:

$$\dot{Z} = f(Z, U, \text{reference}(K, T)) \quad (3)$$

Where Z is a state, U are controls, and reference can correspond to an argument referring to the reference trajectory 302 and can include a curvature K and a tangent vector T associated with a particular frame.

Thus, a first segment 326 can be determined at least in part by the initial state 312, a curvature value K, and a tangent vector T associated with establishing the reference line 316. A second state 328 can be determined as the intersection between the first segment 326 and the reference line 316, whereby the intersection is based at least in part on a curvature value K. As can be understood, the second state 328 can correspond to an origin of a second segment 330, which can in turn intersect with the reference line 318 to define a third state 332.

Further, in some instances, dynamics of a vehicle can be represented by bicycle dynamics (e.g., the vehicle can be represented as a "bicycle" with two wheels and a length L, whereby bicycle dynamics can be represented as:

$$\dot{s} = \frac{v\cos e_\theta}{1 - k(s)e_y} \quad (4)$$

$$\dot{e}_y = v\sin e_\theta \quad (5)$$

$$\dot{e}_\theta = v\left(\frac{\tan\varphi}{L} - k(s)\dot{s}\right) = v\left(\frac{\tan\varphi}{L} - \frac{k(s)\cos e_\theta}{1 - k(s)e_y}\right) \quad (6)$$

$$\dot{v} = a \quad (7)$$

where a can represent acceleration, k(s) can represent a curvature of the reference trajectory at a point s, L can represent a length of the vehicle.

In some instances, a trajectory can be represented as piecewise geometry segments having a curvature that is linear in a segment (e.g., corresponding to s), which is to say that each segment can be a clothoid curve. In some instances, a curvature of an i-th segment along the reference trajectory can be parameterized as:

$$k_i(s) = k_{i0} + k_{i1}s \quad (8)$$

As discussed above, a plurality of data can be associated with each state. Thus, each of the states 312, 328, and 332 can be associated with state information similar to the state 324.

Figure 4:
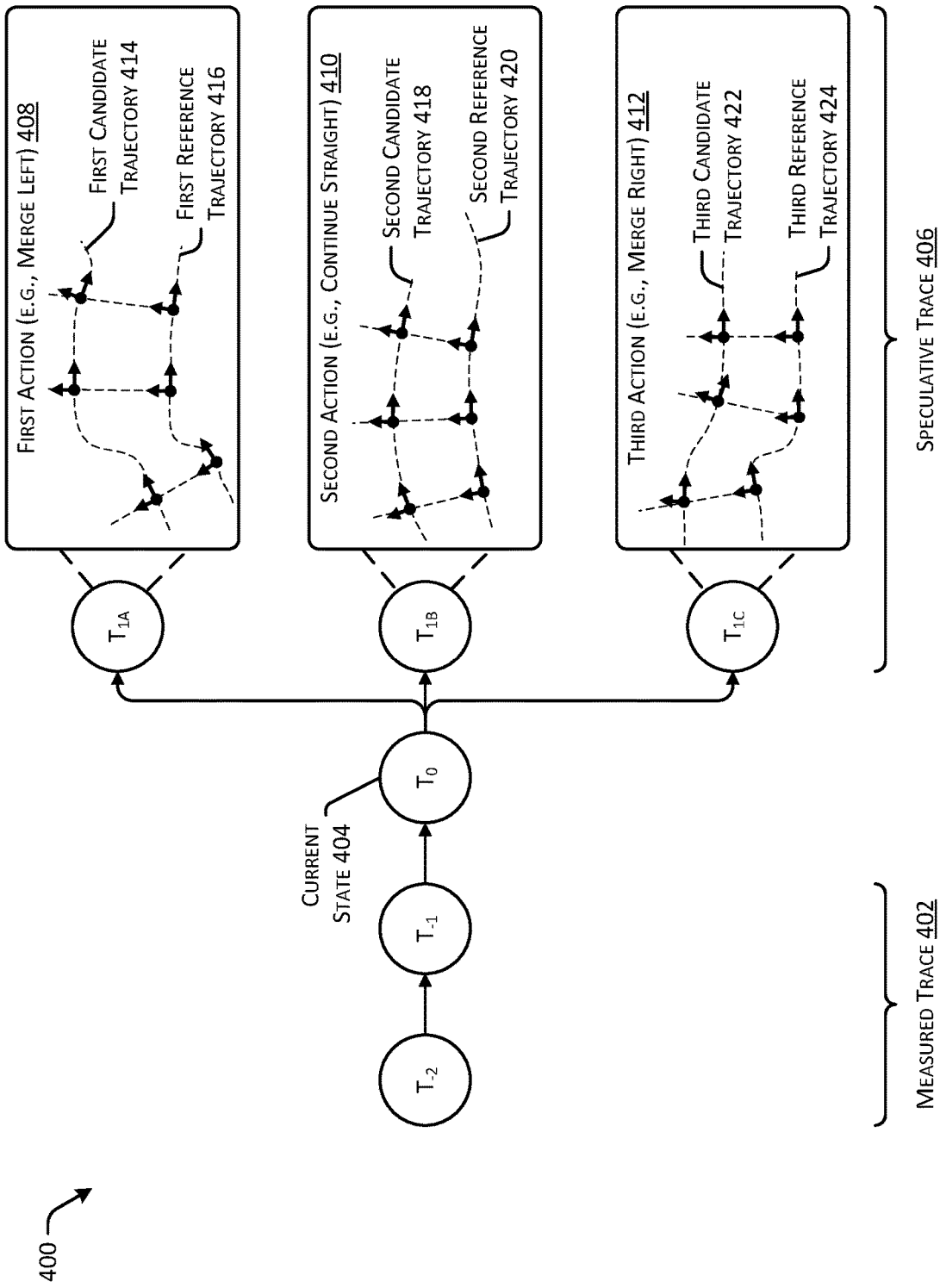
FIG. 4 depicts an example search tree for evaluating candidate trajectories associated with various actions, in accordance with embodiments of the disclosure.

FIG. 4 depicts an example search tree 400 for evaluating candidate trajectories associated with various actions, in accordance with embodiments of the disclosure. In some instances, the search tree 400 can be associated with a measured trace 402, which can store observations about the environment over time, such as the presence of symbols in an environment, states of an autonomous vehicle (e.g., velocity, steering angle, acceleration, etc.). Further, the search tree 400 can be associated with a current state 404, which can include information representing a state of an environment at a particular instant in time, and can include, but is not limited to, various symbol(s), feature(s), predicate(s), LTL formula(s), etc. In some instances, the current state 404 can be considered to be a part of the measured trace 402.

Based at least in part on the current state 404 at $T_0$ (e.g., an initial time), the search tree 400 can evolve motion of the vehicle over time, represented as a speculative trace 406, which can reflect speculations about the environment as various trajectories are considered for selection for the autonomous vehicle. In some examples, the speculative trace 406 can include predictions about other vehicles in the environment with the autonomous vehicle.

As illustrated, the search tree 400 can represent different potential actions, illustrated as a first action 408 (e.g., merge left), a second action 410 (e.g., continue straight), and a third action 412 (e.g., merge right). In some instances, the first action 408 can include a first candidate trajectory 414 based at least in part on a first reference trajectory 416; the second action 410 can include a second candidate trajectory 418 based at least in part on a second reference trajectory 420; and the third action 412 can include a third candidate trajectory 422 based at least in part on a third reference trajectory 424. Thus, it can be understood that multiple actions can be considered in parallel and that candidate trajectories can be determined for each action. Further, one or more costs can be determined for each action and/or candidate trajectories to facilitating selecting actions for the autonomous vehicle to follow.

It can be understood that the search tree 400 can represent speculation in the future as the passage of time moves from left to right in FIG. 4. Nodes have been labeled by time step and to distinguish between different speculative traces. For example, nodes $T_{1A}$, $T_{1B}$, and $T_{1C}$ represent three separate actions at a first time step $T_1$. In some instances, Progressive Widening can be used to determine when to add a new node, which may limit a maximum number of children of a given node based at least in part on a number of times a world state has been considered or visited by the search algorithm. In some instances, each action modeled in the search tree 400 has one or more associated termination conditions. When the search tree 400 reaches a termination condition associated with an action (e.g., completion of a lane change, traversing a section of road, passage of a period of time, movement above a threshold distance, threshold velocity, threshold acceleration, etc.), the search tree 400 may branch and choose a new action to follow. In some instances, a termination condition can be a logical combination of at least two termination conditions. The search can continue until a termination condition is reached for a trajectory or route as they related to a goal, such as a destination.

Within the search tree 400, various permutations of possible trajectories can be modeled and stored as an instance of a tree search to be searched and compared against temporal logic formulas (e.g., linear temporal logic (LTL), signal temporal logic (STL), etc.) determine whether trajectories are valid. For example, as the tree search is built, a snapshot (e.g., representing conditions in an environment) can evolve the context based on changing conditions (e.g., over time, as objects move, etc.), and the snapshot can be checked for compliance with the various TL formulas. If multiple trajectories are determined not to violate the TL formula, a trajectory with a lowest cost (or a highest performance, comfort, etc.) can be selected. For example, for various operations of the autonomous vehicle, or for various possible trajectories, a cost function can penalize acceleration, jerk, lateral acceleration, yaw, steering angle, steering angle rate, etc.

In some instances, machine learning can be used to more accurately determine possible trajectories to investigate using the tree search based on a current state, predictive trajectories of other third-party vehicles, and/or learned trajectories in response to the current state(s) and/or tasks to be completed. For example, based on a current state of an environment, the tree search with machine learning can determine candidate trajectories that are most likely to result in satisfactory outcomes based on learned low-level policies (e.g., how to travel in a road lane, how to change lanes, how to stop, how not to tailgate, etc.) and learned high-level policies (e.g., previously selected actions with good outcomes).

As a non-limiting example, the system may evaluate the best option for proceeding as a choice between merging left (the first action 408), continuing straight (the second action 410), or merging right (the third action 412). An optimal candidate trajectory may be determined based on perturbing the trajectory (as described with respect to FIG. 2) and/or simulating vehicle dynamic with respect to a particular candidate trajectory. The action of the three having the lowest cost after optimization may then be selected for proceeding (e.g., merging left (the first action 408)).

Figure 5:
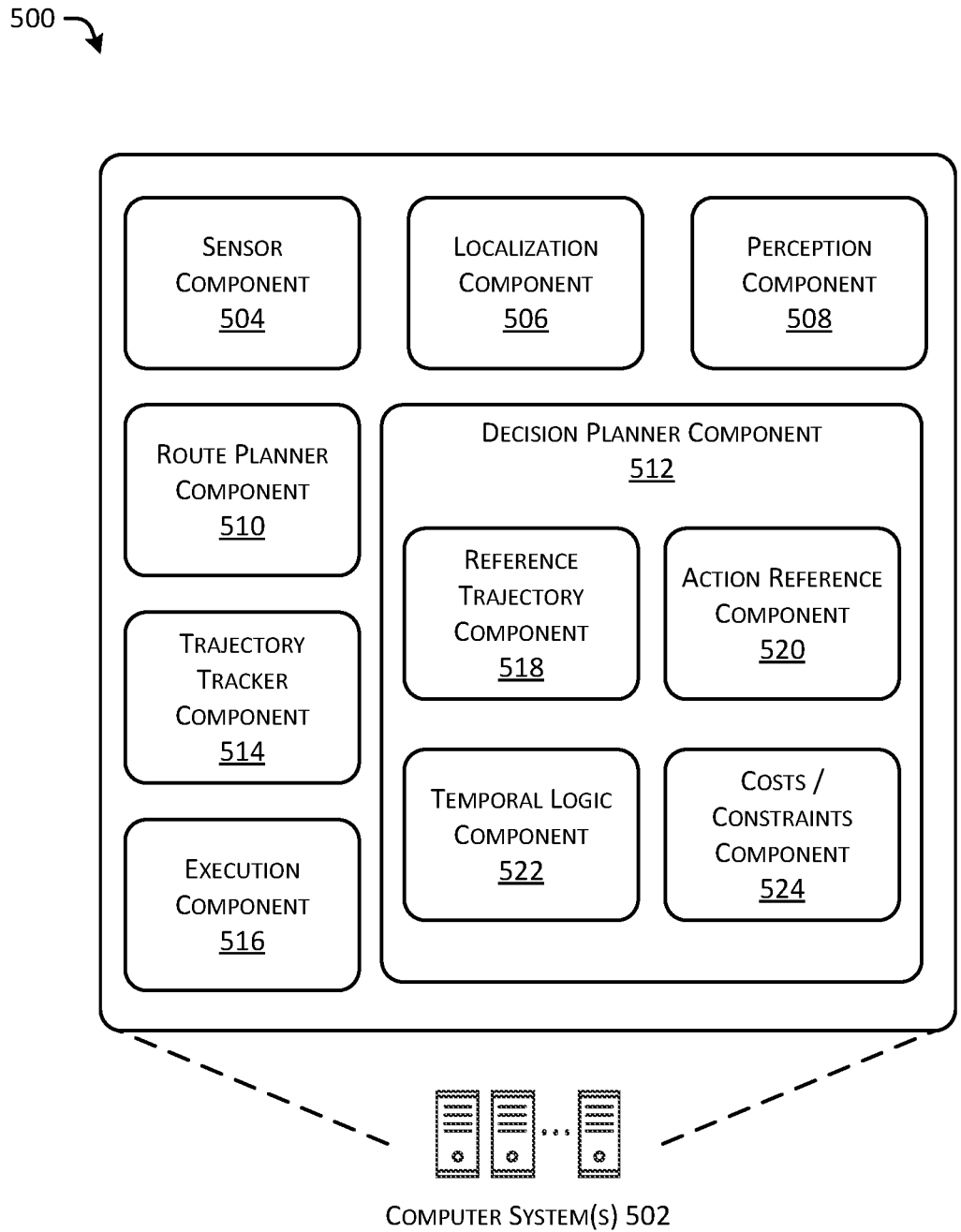
FIG. 5 depicts an example architecture for implementing the trajectory generation using curvature segments, as discussed herein.

FIG. 5 depicts an example architecture 500 for implementing the trajectory generation using curvature segments, as discussed herein. For example, the architecture 500 can include one or more computer systems 502 including a sensor component 504, a localization component 506, a perception component 508, a route planner component 510, a decision planner component 512, a trajectory tracker component 514, and an execution component 516.

Further, the decision planner component can include a reference trajectory component 518, an action reference component 520, a temporal logic component 522, and a costs/constraints component 524.

In some instances, the sensor component 504 can include any number of sensors, including but not limited to an image sensor, a LIDAR sensor, a RADAR sensor, an inertial measurement unit (IMU), and the like.

For example, an image sensor of the sensor component 504 can include any color cameras (e.g., RGB), monochrome cameras, infrared (IR) cameras, depth-cameras (e.g., time of flight cameras), ultraviolet (UV) cameras, stereoscopic cameras, etc. In some instances, the image sensor(s) can be located at various points of an autonomous vehicle, such as the corners of a vehicle, to capture various portions of an environment. In some instances, the image sensor(s) can be associated with extrinsic characteristics indicating a location of the particular image sensor with respect to the vehicle, height, field of view, tilt angle, resolution, and the like.

In some instances, the sensor component 504 can include one or more LIDAR sensors to capture depth data of an environment. In some instances, the LIDAR sensor and the image sensor(s) can operate in conjunction with the localization component 506 to determine a location of an autonomous vehicle, for example, when the architecture 500 is implemented as an autonomous vehicle. In some instances, the sensor component 504 can include any number of LIDAR sensors located to capture various portions of an environment. Further, a LIDAR sensor can be used to determine static and/or dynamic objects based on motion of the objects in the environment.

In some instances, sensor component 504 can include one or more RADAR sensors to capture depth information associated with an environment. In some instances, a RADAR sensor can operate in conjunction with the localization component 506 to determine a location of an autonomous vehicle, for example, when the architecture 500 is implemented as an autonomous vehicle.

In some instances, the sensor component can include one or more inertial measurement unit(s) (IMUs) to determine motion of the computer system(s) 502, especially when implemented as an autonomous vehicle. For example, an IMU can operate in conjunction with the localization component 506 to determine a location of the autonomous vehicle.

In some instances, the sensor component 504 can include any number of additional sensors, including but not limited to sonar sensors, ultrasonic transducers, wheel encoders, microphones, accelerometers, gyroscopes, magnetometers, temperature sensors, humidity sensors, light sensors, global positioning system (GPS) sensors, and the like.

The localization component 506 can include functionality to receive data from the sensor component 504 to determine a position of the computer systems 502 implemented as an autonomous vehicle. For example, the localization component 506 can include a three-dimensional map of an environment and can continuously determine a location of the autonomous vehicle within the map. In some instances, the localization component 506 can utilize SLAM (simultaneous localization and mapping) or CLAMS (calibration, localization and mapping, simultaneously) to receive image data, LIDAR data, RADAR data, IMU data, GPS data, and the like to accurately determine a location of the autonomous vehicle. In some instances, the localization component 506 can provide data to the computer system 502 to determine an initial position of an autonomous vehicle for generating a candidate trajectory, as discussed herein.

In some instances, the perception component 508 can include functionality to perform object detection, segmentation, and/or classification.

In some instances, the route planner component 510 can be configured to determine a most efficient route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. In at least one example, the route planner component 510 can perform a search, such as a graph search, on top of a map to identify a route to guide the autonomous vehicle from a first location to a second location. For the purpose of this discussion, a map can be any number of data structures modeled in two dimensions or three dimensions that are capable of providing information about an environment, such as, but not limited to, topologies (such as intersections), streets, mountain ranges, roads, terrain, and the environment in general. In at least one example, the route planner component 510 can utilize a graph traversal algorithm to identify a route to guide an autonomous vehicle from a first location to a second location. Graph traversal algorithms can include algorithms for unweighted graphs (e.g., breadth first search, depth first search, greedy best first, A* search, etc.) and/or weighted graphs (e.g., Dijkstra's algorithm, weighted A* search, etc.).

In some examples, the route planner component 510 can identify two or more candidate routes for guiding the autonomous vehicle from the first location to the second location. In such examples, the route planner component 510 can rank the two or more candidate routes based on route planning constraint(s). Route planning constraint(s) can include rules of the road, travel time, travel distance, etc. In at least one example, the route planner component 510 can determine that a top-ranking candidate route is the route for guiding the autonomous vehicle from the first location to the second location. The route planner component 510 can output a sequence of waypoints corresponding to the route to the decision planner component 512.

In general, and in some instances, the decision planner component 512 can receive the route (e.g., the sequence of waypoints) and can generate an instruction for guiding the autonomous vehicle along at least a portion of the route from the first location to the second location. In at least one example, the decision planner component 512 can determine how to guide the autonomous vehicle from a first waypoint in the sequence of waypoints to a second waypoint in the sequence of waypoints. In some examples, the instruction can be a trajectory, or a portion of a trajectory. In such examples, the decision planner component 512 can generate a sequence of actions (e.g., drive down the road, accelerate, change lanes, turn left, etc.) to guide the autonomous vehicle along the route. In other examples, the instruction can be a policy. A policy can be used to determine a trajectory of the autonomous vehicle based on real-time processed sensor data received from sensor(s) on the autonomous vehicle.

Further, the decision planner component 512 can include the reference trajectory component 518, the action reference component 520, the temporal logic component 522, and the costs/constraints component 524.

The reference trajectory component 518 can be configured to generate an "ideal" route based at least in part on the route provided by the route planner component 510. In some instances, and as discussed above in connection with FIG. 4, the reference trajectory component 518 can generate a plurality of reference trajectories, each reference trajectory corresponding to an individual action. In some instances, a reference trajectory can be based at least in part on a centerline of a road segment (e.g., to orient a vehicle within a center of a lane). In some instances, reference trajectories can be determined by the reference trajectory component 518 and/or can be received from an external computing device (e.g., from a teleoperations center).

The action reference component 520 can be configured to generate one or more candidate trajectories using curvature segments, as discussed herein. In some instances, the candidate trajectory can be based at least in part on the reference trajectory generated by the reference trajectory component 518. In some instances, discrete segments can collectively form a candidate trajectory, with curvature values associated with each segment. The segments can be initialized with a straight-line curvature, can be initialized with a curvature of the corresponding reference trajectory, or can be initialized with some other value. As discussed herein, the candidate trajectories can be perturbed to determine an optimal trajectory with respects to costs and/or constraints, as discussed herein.

The temporal logic component 522 can include functionality to receive data about an environment in which the autonomous vehicle is navigating and can develop temporal logic formulas to evaluate candidate trajectories generated by the action reference component 520. For example, the temporal logic component 522 can receive perception data from the perception component 508 to determine static or dynamic symbols in an environment. The temporal logic component 522 can generate features, predicates, and temporal logic formula based on the symbols in an environment that logically describe "correct" behavior of a vehicle navigating in the environment. The temporal logic component 522 can include linear temporal logic and/or signal temporal logic to evaluate candidate trajectories. In some instances, the temporal logic component 522 can generate automata as a finite state machine to evaluate trajectories over time.

The costs/constraints component 524 can be configured to determine costs and/or constraints associated with the various candidate trajectories. In some instances, examples of a constraint can include, but are not limited to, physical limitation based on dynamics of a vehicle or an environment, such as a maximum curvature of a trajectory, restrictions that a position of a vehicle cannot jump laterally, restrictions that a velocity must be continuous, restrictions that a curvature of a trajectory must be continuous, and the like. In some instances, examples of costs can include, but are not limited to, a distance between the vehicle and a reference trajectory, a distance between the vehicle and an obstacle, acceleration/deceleration, steering rate, velocity, comfort, performance, safety, rules of the road, and the like.

In some instances, the trajectory tracker component 514 can include functionality to receive an instruction (e.g., from the decision planner component 512) and optimize the instruction based on objects identified in the environment. In at least one example, the trajectory tracker component 514 can access, receive, and/or determine real-time processed sensor data to determine object(s) in the environment which the autonomous vehicle is travelling. In the at least one example, the trajectory tracker component 514 can process the instruction in view of the real-time processed sensor data.

In an example where the instruction is a trajectory, the trajectory tracker component 514 can leverage model(s) and/or algorithm(s), constraint(s), and/or cost(s) to optimize the trajectory. For instance, the trajectory tracker component 514 can utilize model(s) and/or algorithm(s) including, but not limited to, differential dynamic programming, interior point optimization, sequential quadratic programming, etc. to refine the trajectory. In at least one example, the constraint(s) can include, but are not limited to, cost(s), comfort, safety, rules of the road, etc. In at least one example, the cost(s) can include, but are not limited to, performance (e.g., speed), minimizing lateral acceleration, positioning in a lane, etc. In at least one example, the model(s) and/or algorithm(s) can include bi-directionality. In such an example, a velocity of the autonomous vehicle can be optimized to include a positive, a negative, or a zero value. In at least one example, a rotation of the autonomous vehicle can be described using Euclidian matrices. As a result, a same model and/or algorithm can be used for optimizing a trajectory having different types of waypoints (e.g., road, intersection, roundabout, etc.). Based at least in part on processing the trajectory, in view of the real-time processed sensor data, the trajectory tracker component 514 can generate an output trajectory.

In an example where the instruction is a policy, the trajectory tracker component 514 can leverage model(s) and/or algorithm(s), constraint(s), and/or cost(s) to generate a trajectory based on the policy and real-time processed sensor data. For instance, the trajectory tracker component 514 can utilize model(s) and/or algorithm(s) including, but not limited to, differential dynamic programming, interior point optimization, sequential quadratic programming, etc. to generate a trajectory based on the policy. For the purpose of this discussion, the trajectory can be called an output trajectory.

As described above, the trajectory tracker component 514 can access, receive, and/or determine real-time processed sensor data. The trajectory tracker component 514 can leverage the real-time processed sensor data to generate an output trajectory. The trajectory tracker component 514 can utilize a more detailed model of the autonomous vehicle than the decision planner component 512. Processing that utilizes such a detailed model can be computationally expensive. Additionally, the trajectory tracker component 514 can output an output trajectory within a predetermined amount of time after receiving the real-time processed sensor data. For instance, in at least one example, the trajectory tracker component 514 can receive an interrupt requesting an output trajectory and the trajectory tracker component 514 can provide an output trajectory responsive to receiving the interrupt.

In some instances, the execution component 516 can include functionality to receive an output trajectory from the trajectory tracker component 514 and can compute commands for actuating steering and acceleration of the autonomous vehicle to enable the autonomous vehicle to follow the output trajectory. In at least one example, the execution component 516 can receive the output trajectory and can compute a steering angle and velocity to enable the autonomous vehicle to follow the output trajectory. In some examples, the execution component 516 can include a separate vehicle controller configured to control steering, propulsion, braking, safety, emitters, communication, and other systems of the vehicle.

In some instances, aspects of some or all of the components discussed herein may include any models, algorithms, and/or machine learning algorithms. For example, in some instances, the components in the architecture 500 may be implemented as a neural network.

As described herein, an exemplary neural network is a biologically inspired algorithm which passes input data through a series of connected layers to produce an output. As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, and the like.

FIGS. 1, 2, 6, and 7 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 6:
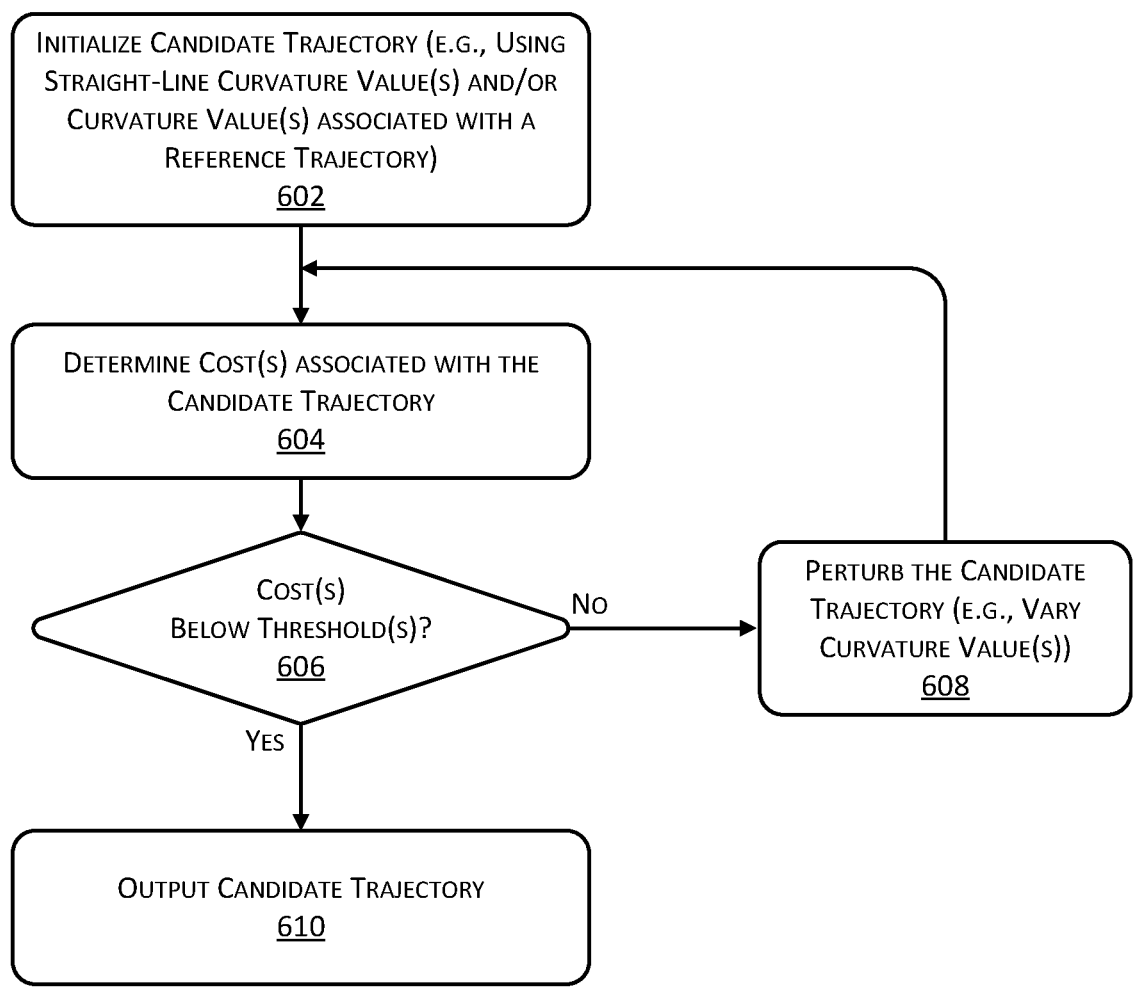
FIG. 6 depicts an example process for determining a candidate trajectory, determining costs, and perturbing the candidate trajectory based on the costs, as discussed herein.

FIG. 6 depicts an example process 600 for determining a candidate trajectory, determining costs, and perturbing the candidate trajectory based on the costs, as discussed herein. For example, some or all of the process 600 can be performed by one or more components in the FIG. 5 or 8, as described herein. For example, some or all of the process 600 can be performed by the decision planner component 512, the trajectory tracker component 514, and/or the execution component 516.

At operation 602, the process can include initializing a candidate trajectory (e.g., using straight-line curvature value(s) and/or curvature values associated with a reference trajectory). In some instances, the operation 602 can include bounding the initialization values such that a segment associated with a frame of a candidate trajectory intersects with a reference line of a next frame, curvatures are continuous between frames, and the like. As discussed herein, the operation 602 can include determining frames associated with a reference trajectory, determining an initial position of a vehicle, and extending a segment from the initial position to a reference line associated with the next frame. As discussed herein, a location of an intersection point between the segment and a reference line can be based at least in part on the curvature values. Segments for frames can be successively generated until a candidate trajectory extends from a current location of a vehicle to an end of a receding horizon, for example. Separation between frames may be based on, for example, constant time between frames, constant length between frames, constant curvature between frames, or the like.

At operation 604, the process can include determining costs associated with the candidate trajectory. In some instances, the operation 604 can also include determining constraints associated with the candidate trajectory. As discussed herein, examples of a constraint can include, but are not limited to, physical dynamics of a vehicle and/or an environment. In some instances, examples of costs can include, but are not limited to, a distance between the vehicle and a reference trajectory, violating rules of the road (e.g. obey speed limits, stop at stop signs, etc.), a distance between the vehicle and an obstacle, acceleration/deceleration, steering rate, velocity, comfort, performance, safety, and the like. In some instances, costs can be determined for individual segments and summed or integrated across the candidate trajectory.

At operation 606, the process can include determining whether the costs are below a threshold value. In some implementations, the operation 606 can include determining whether the costs meet or exceed a threshold value. In some instances, the operation 606 can include determining whether a difference in costs between a current iteration and a previous iteration is below a threshold value. If the costs are not below the threshold value (e.g., "no" in the operation 606), the process continues to the operation 608.

At operation 608, the process can include perturbing the candidate trajectory, for example, by varying one or more curvature values of the segments comprising the candidate trajectory. For example, varying a curvature value of the individual segments can cause the candidate trajectory to "wiggle" around obstacles and/or to optimize the trajectory. In some instances, varying the curvature values can be performed by a machine learning algorithm that has been trained with various optimal trajectories when encountering obstacles. In some instances, varying the curvature values can be based at least in part on a projected-Newton method or a gradient descent, for example. After the candidate trajectory has been perturbed, thereby generating a revised candidate trajectory, costs associated with the revised candidate trajectory can be determined in the operation 604, and the costs can be compared against the threshold value in the operation 606.

If the costs are below the threshold value (e.g., "yes" in the operation 606), the process continues to the operation 610. In some instances, the operation At operation 610, the process can include outputting the candidate trajectory. In some instances, the candidate trajectory can be output to another selection step whereby a candidate trajectory can be selected from a plurality of optimized candidate trajectories corresponding to various actions (e.g., optimal trajectories for merging left, merging right, stopping, continuing straight, etc.). In some instances, the candidate trajectory can be output to the trajectory tracker component 514 and/or the execution component 516 to control an autonomous vehicle to follow the candidate trajectory.

Figure 7:
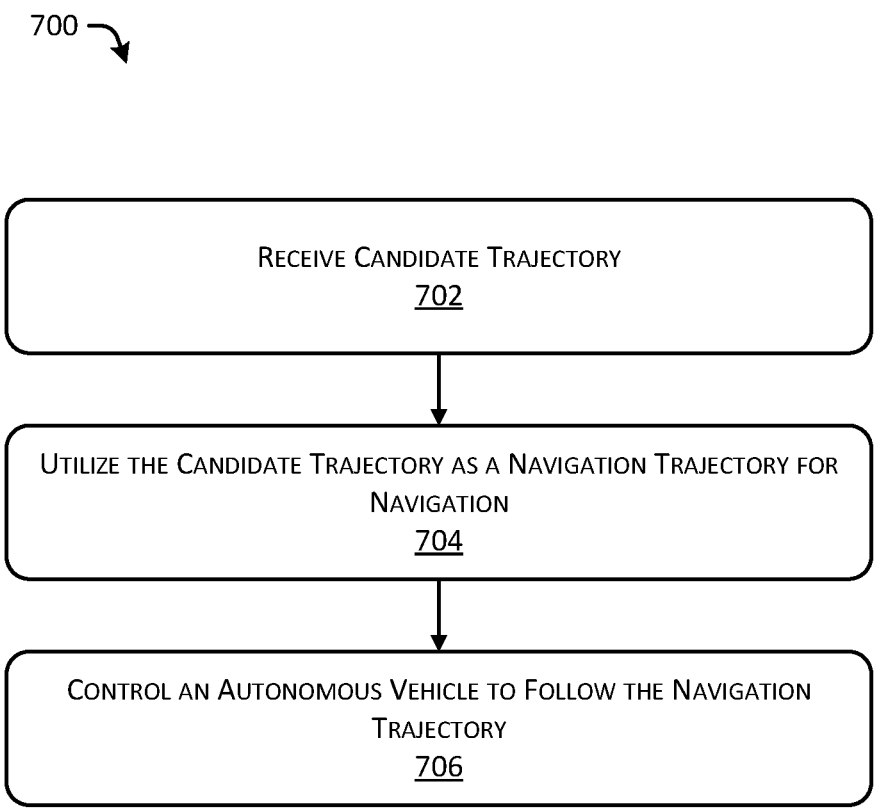
FIG. 7 depicts an example process for controlling an autonomous vehicle based at least in part on a candidate trajectory, as discussed herein.

FIG. 7 depicts an example process 700 for controlling an autonomous vehicle based at least in part on a candidate trajectory, as discussed herein. For example, some or all of the process 700 can be performed by one or more components in the FIG. 5 or 8, as described herein. For example, some or all of the process 700 can be performed by the decision planner component 512, the trajectory tracker component 514, and/or the execution component 516.

At operation 702, the process can include receiving a candidate trajectory. In some instances, the candidate trajectory received in the operation 702 can include an optimized trajectory that is to be implemented by components of an autonomous vehicle. For example, the candidate trajectory of the operation 702 may have been selected as an action to be performed and optimized to minimize one or more costs while respecting motion dynamics, safety, performance, mission requirements, and the like. In some instances, the candidate trajectory can be received by the decision planner component 512, the trajectory tracker component 514, and/or the execution component 516. In some instances, the operation 702 can include simulating the vehicle dynamics with respect to the candidate trajectory and/or simulating various fallback or stopping operations with respect to the candidate trajectory or obstacles that may be present in an environment with respect to the candidate trajectory.

At operation 704, the process can include utilizing the candidate trajectory as a navigation trajectory for navigation. For example, the candidate trajectory can be considered a "reference trajectory" such that the motion of the vehicle is controlled to follow the navigation trajectory. In some instances, the navigation trajectory can include a series of control inputs to the autonomous vehicle to receive in order to follow the candidate trajectory. In some instances, control inputs can include any number of acceleration values, steering angles, timing information, and the like.

At operation 706, the process can include controlling an autonomous vehicle to follow the navigation trajectory. The operation 706 can include generating a sequence of commands to command the autonomous vehicle to drive along the trajectory received in the operation 702. In some instances, the commands generated in the operation 706 can be relayed to a controller onboard the autonomous vehicle, such as the trajectory tracker component 514, the execution component 516, etc., to control the autonomous vehicle to traverse the trajectory. In some instances, the operation 706 can include monitoring motion of the autonomous vehicle to confirm whether the autonomous vehicle is following the navigation trajectory and/or to determine whether another candidate trajectory can be generated. Although discussed in the context of an autonomous vehicle, the process 700, and the techniques and systems described herein, can be applied to a variety systems utilizing route planning and/or machine vision.

Figure 8:
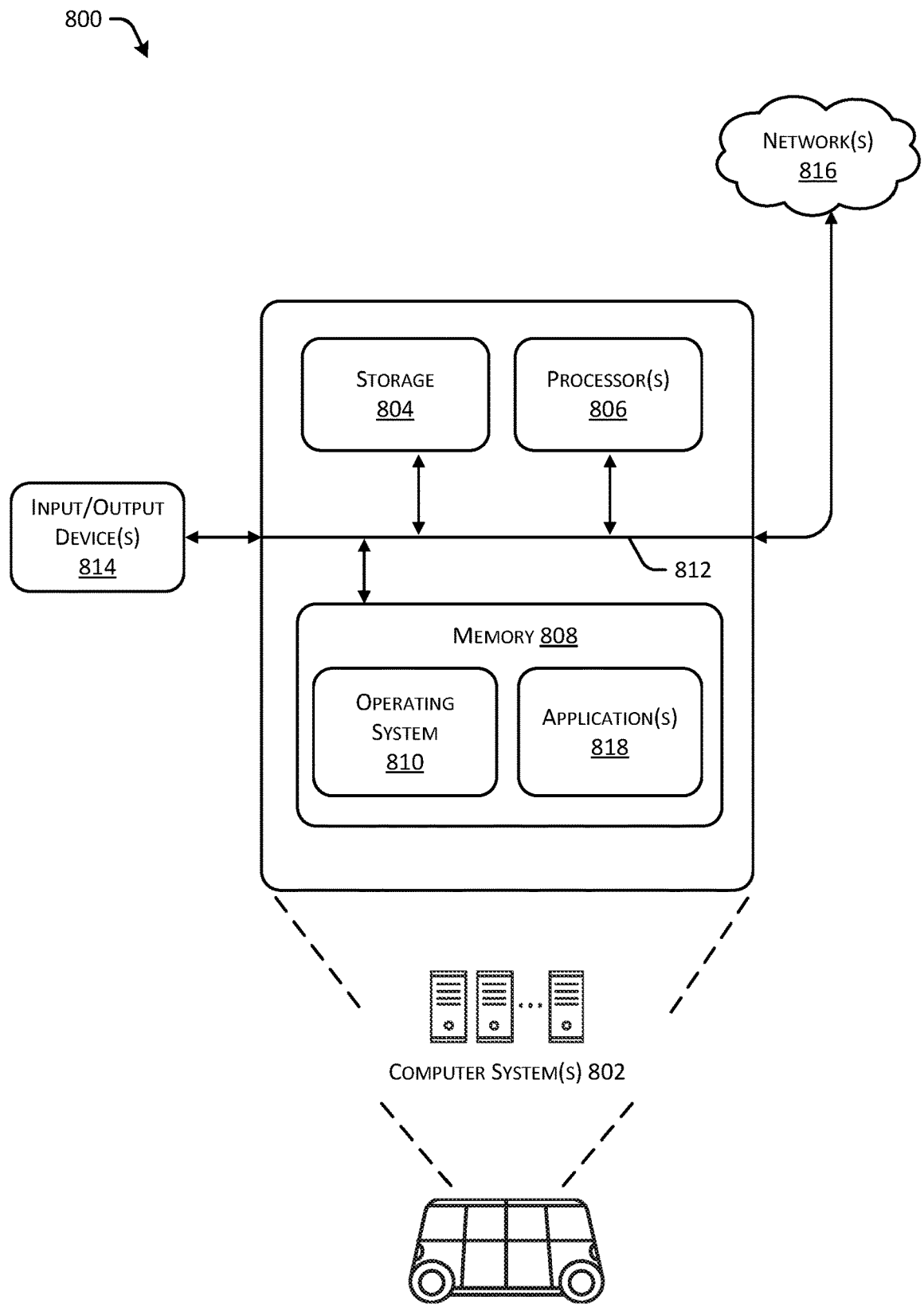
FIG. 8 depicts a block diagram of an example computer system for implementing the techniques described herein.

FIG. 8 illustrates an environment 800 in which the disclosures may be implemented in whole or in part. The environment 800 depicts one or more computer systems 802 that comprise a storage 804, one or more processor(s) 806, a memory 808, and an operating system 810. The storage 804, the processor(s) 806, the memory 808, and the operating system 810 may be communicatively coupled over a communication infrastructure 812. Optionally, the computer system 802 may interact with a user, or environment, via input/output (I/O) device(s) 814, as well as one or more other computing devices over a network 816, via the communication infrastructure 812. The operating system 810 may interact with other components to control one or more applications 818.

As can be understood in the context of this disclosure, the computer system 802 can be implemented in an autonomous vehicle, a semi-autonomous vehicle, or any other vehicle.

In some instances, the computer system(s) 802 may implement (at least in part) the functions of the architecture 500, as discussed herein.

The systems and methods described herein can be implemented in software or hardware or any combination thereof. The systems and methods described herein can be implemented using one or more computing devices which may or may not be physically or logically separate from each other. The methods may be performed by components arranged as either on-premise hardware, on-premise virtual systems, or hosted-private instances. Additionally, various aspects of the methods described herein may be combined or merged into other functions.

An exemplary environment and computerized system for implementing the systems and methods described herein is illustrated in FIG. 8. A processor or computer system can be configured to particularly perform some or all of the methods described herein. In some embodiments, the methods can be partially or fully automated by one or more computers or processors. The systems and methods described herein may be implemented using a combination of any of hardware, firmware, and/or software. The present systems and methods described herein (or any part(s) or function(s) thereof) may be implemented using hardware, software, firmware, or a combination thereof and may be implemented in one or more computer systems or other processing systems. In some embodiments, the illustrated system elements could be combined into a single hardware device or separated into multiple hardware devices. If multiple hardware devices are used, the hardware devices could be physically located proximate to or remotely from each other. The embodiments of the methods described and illustrated are intended to be illustrative and not to be limiting. For example, some or all of the steps of the methods can be combined, rearranged, and/or omitted in different embodiments.

The system may include one or more processors. The processor(s) may be connected to a communication infrastructure, such as but not limited to, a communications bus, cross-over bar, or network, etc. The processes and processors need not be located at the same physical locations. In other words, processes can be executed at one or more geographically distant processors, over for example, a LAN or WAN connection.

The computer system may also include, but is not limited to, a main memory, random access memory (RAM), and a secondary memory, etc. The secondary memory may include, for example, a hard disk drive and/or a removable storage drive, such as a compact disc drive CD-ROM, etc. The removable storage drive may read from and/or written to a removable storage unit. As may be appreciated, the removable storage unit may include a computer usable storage medium having stored therein computer software and/or data. In some embodiments, a machine-accessible medium may refer to any storage device used for storing data accessible by a computer. Examples of a machine-accessible medium may include, e.g., but not limited to: a magnetic hard disk; a floppy disk; an optical disk, like a compact disc read-only memory (CD-ROM) or a digital versatile disc (DVD); a magnetic tape; and/or a memory chip, etc.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM discs. The processor and the memory can be supplemented by, or incorporated in, ASICs (application-specific integrated circuits).

The processing system can be in communication with a computerized data storage system. The data storage system can include a non-relational or relational data store, such as a MySQL™ or other relational database. Other physical and logical database types could be used. The data store may be a database server, such as Microsoft SQL Server™, Oracle™, IBM DB2™, SQLITE™, or any other database software, relational or otherwise.

The computing device may include input/output (I/O) devices such as but not limited to a communications interface, cable and communications path, etc. These devices may include, but are not limited to, a network interface card, and modems. Communications interface(s) may allow software and data to be transferred between a computer system and one or more external devices.

In one or more embodiments, the computing device may be operatively coupled to an automotive system. Such automotive system may be either manually operated, semi-autonomous, or fully autonomous. In such an embodiment, input and output devices may include one or more image capture devices, controllers, microcontrollers, and/or other processors to control automotive functions such as, but not limited to, acceleration, braking, and steering. Further, communication infrastructure in such embodiments may also include a Controller Area Network (CAN) bus.

In one or more embodiments, the computing device may be operatively coupled to any machine vision based system. For example, such machine based vision systems include but are not limited to manually operated, semi-autonomous, or fully autonomous industrial or agricultural robots, household robot, inspection system, security system, etc. That is, the embodiments described herein are not limited to one particular context and may be applicable to any application utilizing machine vision.

In one or more embodiments, the present embodiments can be practiced in the environment of a computer network or networks. The network can include a private network, or a public network (for example the Internet, as described below), or a combination of both. The network may include hardware, software, or a combination of both.

In an exemplary embodiment, the processes may communicate with one another through interprocess communication pathways supporting communication through any communications protocol. The pathways may function in sequence or in parallel, continuously or intermittently. The pathways can use any of the communications standards, protocols or technologies, described herein with respect to a communications network, in addition to standard parallel instruction sets used by many computers.

The nodes may include any entities capable of performing processing functions. Examples of such nodes that can be used with the embodiments include computers (such as personal computers, workstations, servers, or mainframes), handheld wireless devices and wireline devices (such as modem cell phones with processing capability, wireless email devices including BlackBerry™ devices), or complex entities (such as local-area networks or wide area networks) to which are connected a collection of processors, as described. For example, in the context of the present disclosure, a node itself can be a wide-area network (WAN), a local-area network (LAN), a private network (such as a Virtual Private Network (VPN)), or collection of networks.

Communications between the nodes may be made possible by a communications network. A node may be connected either continuously or intermittently with communications network. As an example, in the context of the present disclosure, a communications network can be a digital communications infrastructure providing adequate bandwidth and information security.

The communications network can include wireline communications capability, wireless communications capability, or a combination of both, at any frequencies, using any type of standard, protocol or technology. In addition, in the present embodiments, the communications network can be a private network (for example, a VPN) or a public network (for example, the Internet).

A non-inclusive list of exemplary wireless protocols and technologies used by a communications network may include Bluetooth™, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. An exemplary non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP) and user datagram protocol (UDP). As skilled persons will recognize, any other known or anticipated wireless or wireline protocols and technologies can be used.

Embodiments of the present disclosure may include apparatuses for performing the operations herein. An apparatus may be specially constructed for the desired purposes, or it may comprise a general purpose device selectively activated or reconfigured by a program stored in the device.

In one or more embodiments, the present embodiments are embodied in machine-executable instructions. The instructions can be used to cause a processing device, for example a general-purpose or special-purpose processor, which is programmed with the instructions, to perform the steps of the present disclosure. Alternatively, the steps of the present disclosure can be performed by specific hardware components that contain hardwired logic for performing the steps, or by any combination of programmed computer components and custom hardware components. For example, the present disclosure can be provided as a computer program product, as outlined above. In this environment, the embodiments can include a machine-readable medium having instructions stored on it. The instructions can be used to program any processor or processors (or other electronic devices) to perform a process or method according to the present exemplary embodiments. In addition, the present disclosure can also be downloaded and stored on a computer program product. Here, the program can be transferred from a remote computer (e.g., a server) to a requesting computer (e.g., a client) by way of data signals embodied in a carrier wave or other propagation medium via a communication link (e.g., a modem or network connection) and ultimately such signals may be stored on the computer systems for subsequent execution.

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks.

A computer program can be a set of instructions that can be used, directly or indirectly, in a computer. The systems and methods described herein can be implemented using programming languages such as CUDA, OpenCL, Flash™, JAVA™, C++, C, C#, Python, Visual Basic™, JavaScript™ PHP, XML, HTML, etc., or a combination of programming languages, including compiled or interpreted languages, and can be deployed in any form, including as a stand-alone program or as a module, component, subroutine, or other unit suitable for use in a computing environment.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The systems, modules, and methods described herein can be implemented using any combination of software or hardware elements. The systems, modules, and methods described herein can be implemented using one or more virtual machines operating alone or in combination with one other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more embodiments of the present disclosure may be practiced with other computer system configurations, including hand-held devices, microprocessor systems, microprocessor-based or programmable consumer electronics, minicomputers, mainframe computers, etc. The systems and methods described herein may also be practiced in distributed computing environments where tasks are performed by remote processing devices that are linked through a network.

The terms "computer program medium" and "computer readable medium" may be used to generally refer to media such as but not limited to removable storage drive, a hard disk installed in hard disk drive. These computer program products may provide software to computer system. The systems and methods described herein may be directed to such computer program products.

References to "one embodiment," "an embodiment," "example embodiment," "various embodiments," etc., may indicate that the embodiment(s) of the present disclosure may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may. Similarly, references to "instances" may indicate that various instance(s) of the present disclosure may include a particular feature, structure, or characteristic, but not every instance necessarily includes the particular feature, structure, or characteristic. Further, repeated use of the phrase "in some instances" does not necessarily refer to the same instance, although it may.

In the description and claims, the terms "coupled" and "connected," along with their derivatives, may be used. It should be understood that these terms may be not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm may be here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, it may be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. As non-limiting examples, "processor" may be a Central Processing Unit (CPU) or a Graphics Processing Unit (GPU). A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system" and "method" are used herein interchangeably insofar as the system may embody one or more methods and the methods may be considered as a system.

While one or more embodiments have been described, various alterations, additions, permutations and equivalents thereof are included within the scope of the disclosure.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some implementations the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

Although the discussion above sets forth example implementations of the described techniques, other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

Example Clauses

A. A system comprising: one or more processors; and one or more computer-readable media storing instructions executable by the one or more processors, wherein the instructions program the one or more processors to: determine a reference trajectory for an autonomous vehicle to traverse an environment; determine a first frame associated with the reference trajectory; determine a second frame associated with the reference trajectory, the second frame associated with a tangent vector of a second point on the reference trajectory; determine a state of the autonomous vehicle including at least a position of the autonomous vehicle relative to the reference trajectory; determine a candidate trajectory of the autonomous vehicle, the candidate trajectory including a segment having an origin and a curvature value associated with the position of the autonomous vehicle and intersecting at an intersection point with a reference line that is substantially perpendicular to the tangent vector associated with the second point, the intersection point based at least in part on the curvature value; and output an output trajectory to a vehicle controller to control the autonomous vehicle, the output trajectory based at least in part on the candidate trajectory.

B: The system of paragraph A, wherein the instructions, when executed by the one or more processors, further program the one or more processors to: initialize the curvature value of the segment based at least in part on a curvature associated with the first frame.

C: The system of paragraph A or B, wherein the instructions, when executed by the one or more processors, further program the one or more processors to: optimize, as the output trajectory, the candidate trajectory based at least in part on a projected-Newton method.

D: The system of any of paragraphs A-C, wherein the instructions, when executed by the one or more processors, further program the one or more processors to: determine one or more costs associated with the candidate trajectory based at least in part on: a first distance from the autonomous vehicle to a corresponding frame on the reference trajectory; a second distance between the autonomous vehicle and an obstacle; an acceleration of the autonomous vehicle; a steering rate of change of the autonomous vehicle; or a length of the candidate trajectory with respect to a length of the reference trajectory.

E: The system of any of paragraphs A-D, wherein the curvature value is a first curvature value, wherein the candidate trajectory is associated with the first curvature value, and wherein the instructions, when executed by the one or more processors, further program the one or more processors to: determine one or more first costs associated with the candidate trajectory; determine the output trajectory based at least in part on a second curvature value that is different than the first curvature value; determine one or more second costs associated with the output trajectory; determine a cost difference between the one or more first costs and the one or more second costs; determine that the cost difference is below a threshold value; and output the output trajectory to the vehicle controller to control the autonomous vehicle based at least in part on the cost difference being below the threshold value.

F: The system of any of paragraphs A-E, wherein the candidate trajectory is a first candidate trajectory associated with a first action, and wherein the instructions, when executed by the one or more processors, further program the one or more processors to: determine one or more first costs associated with the first candidate trajectory; determine a second candidate trajectory associated with a second action; determine one or more second costs associated with the second candidate trajectory; select, as a selected action, the first action or the second action based at least in part on the one or more first costs and the one or more second costs; and output the selected action to a vehicle controller to control the autonomous vehicle.

G: The system of any of paragraphs A-F, wherein the state of the autonomous vehicle further includes at least: a velocity of the autonomous vehicle; a steering angle; a lateral offset; and an angular offset.

H: The system of any of paragraphs A-G, wherein: the tangent vector is a first tangent vector; the reference line is a first reference line; the segment is a first segment; and the instructions, when executed by the one or more processors, further program the one or more processors to: determine a third frame associated with the reference trajectory, the third frame associated with a second tangent vector associated with a third point on the reference trajectory; and determine a second segment of the candidate trajectory having an origin associated with the intersection point and intersecting with a second reference line that is substantially perpendicular to the second tangent vector associated with the third point.

I: The system of any of paragraphs A-H, wherein: the candidate trajectory includes a plurality of segments, a number of the plurality of segments based at least in part on one or more of a time period, a length, or a curvature, and the instructions, when executed by the one or more processors, further program the one or more processors to: adjust one or more curvature values associated with the plurality of segments based at least in part on one or more costs associated with the candidate trajectory.

J: A method comprising: determining a reference trajectory for an autonomous vehicle to traverse an environment; determining one or more frames associated with the reference trajectory, the one or more frames associated with locations along the reference trajectory; determining an initial state of the autonomous vehicle, the initial state associated with a first frame of the one or more frames; determining a reference line based at least in part on a second frame of the one or more frames; determining, based at least in part on the initial state and the reference line, one or more candidate trajectories; and outputting an output trajectory to a vehicle controller to control the autonomous vehicle, the one or more candidate trajectories including the output trajectory.

K: The method of paragraph J, wherein a candidate trajectory of the one or more candidate trajectories includes a plurality of segments, a segment of the plurality of segments associated with a curvature value, the method further comprising: determining that a first cost associated with the candidate trajectory is meets a threshold value; varying, as a revised curvature value, the curvature value of the segment; determining a revised candidate trajectory based at least in part on the revised curvature value; and determining that a second cost associated with the revised candidate trajectory does not meet the threshold value.

L: The method of paragraph J or K, wherein a candidate trajectory of the one or more candidate trajectories corresponds to one or more actions, the one or more actions including: the autonomous vehicle merging to a left lane; the autonomous vehicle merging to a right lane; the autonomous vehicle continuing in a current lane; or the autonomous vehicle stopping.

M: The method of any of paragraphs J-L, wherein the one or more candidate trajectories includes a first candidate trajectory, the method further comprising: determining one or more first costs associated with the first candidate trajectory; determining a second candidate trajectory of the one or more candidate trajectories; determining one or more second costs associated with the second candidate trajectory; and selecting, as the output trajectory, the first candidate trajectory or the second candidate trajectory based at least in part on the one or more first costs and the one or more second costs.

N: The method of any of paragraphs J-M, wherein a candidate trajectory of the one or more candidate trajectories includes a segment: having an origin associated with the initial state; and intersecting with the reference line at an intersection point; and wherein the method further comprises determining a location of the intersection point based at least in part on a curvature value associated with the segment.

O: The method of paragraph N, wherein: the segment is a first segment, the curvature value is a first curvature value, the origin is a first origin, the intersection point is a first intersection point, and the reference line is a first reference line, the method further comprising: determining a second reference line based at least in part on a third frame of the one or more frames; determining a second segment of the candidate trajectory, the second segment: having a second origin based at least in part on the first intersection point; and intersecting with the second reference line at a second intersection point; and determining the second intersection point based at least in part on a second curvature value associated with the second segment.

P: The method of any of paragraphs J-O, wherein a number of segments associated with a candidate trajectory of the one or more candidate trajectories is based at least in part on one or more of a first distance, a first time, or a first curvature between the one or more frames and one or more of a second distance or a second time associated with a receding horizon.

Q: A non-transitory computer-readable medium storing instructions that, when executed, cause one or more processors to perform operations comprising: determining a reference trajectory for an autonomous vehicle to traverse an environment; determining one or more frames associated with the reference trajectory, the one or more frames associated with locations along the reference trajectory; determining one or more reference lines, the one or more reference lines associated with the one or more frames; determining an initial state associated with the autonomous vehicle, the initial state associated with a frame of the one or more frames; determining, based at least in part on the initial state and the one or more reference lines, one or more candidate trajectories; and outputting an output trajectory to a vehicle controller to control the autonomous vehicle, the one or more candidate trajectories including the output trajectory.

R: The non-transitory computer-readable medium of paragraph Q, the operations further comprising: determining one or more intersection points between the one or more reference lines and the one or more candidate trajectories. determining one or more curvature values associated with the one or more intersection points, wherein a segment of a candidate trajectory of the one or more candidate trajectories is based at least in part the curvature value.

S: The non-transitory computer-readable medium of paragraph Q or R, where the frame is a first frame, the operations further comprising: determining a tangent vector associated with a second frame of the one or more frames, wherein a reference line of the one or more reference lines is normal to the tangent vector.

T: The non-transitory computer-readable medium of any of paragraphs Q-S, wherein the operations further comprise: selecting, as the output trajectory, a candidate trajectory of the one or more candidate trajectories having a lowest cost; and determining a command configured to cause the autonomous vehicle to navigate based, at least in part, on the output trajectory.

While the example clauses described above are described with respect to one particular implementation, it should be understood that, in the context of this document, the content of the example clauses can also be implemented via a method, device, system, and/or computer-readable medium.

What is claimed is:

1. A system comprising:
one or more processors; and
one or more computer-readable media storing instructions executable by the one or more processors, wherein the instructions program the one or more processors to:
determine a reference trajectory for an autonomous vehicle to traverse an environment;
determine a first frame associated with the reference trajectory;
determine a second frame associated with the reference trajectory, the second frame associated with a tangent vector of a second point on the reference trajectory;
determine a state of the autonomous vehicle including at least a position of the autonomous vehicle relative to the reference trajectory;
determine a candidate trajectory of the autonomous vehicle, the candidate trajectory including a segment having an origin and a curvature value associated with the position of the autonomous vehicle and intersecting at an intersection point with a reference line that is substantially perpendicular to the tangent vector associated with the second point, the intersection point based at least in part on the curvature value; and
output an output trajectory to a vehicle controller to control the autonomous vehicle, the output trajectory based at least in part on the candidate trajectory.

2. The system of claim 1, wherein the instructions, when executed by the one or more processors, further program the one or more processors to:
initialize the curvature value of the segment based at least in part on a curvature associated with the first frame.

3. The system of claim 1, wherein the instructions, when executed by the one or more processors, further program the one or more processors to:
optimize, as the output trajectory, the candidate trajectory based at least in part on a projected-Newton method.

4. The system of claim 1, wherein the instructions, when executed by the one or more processors, further program the one or more processors to:
determine one or more costs associated with the candidate trajectory based at least in part on:
a first distance from the autonomous vehicle to a corresponding frame on the reference trajectory;
a second distance between the autonomous vehicle and an obstacle;
an acceleration of the autonomous vehicle;
a steering rate of change of the autonomous vehicle; or
a length of the candidate trajectory with respect to a length of the reference trajectory.

5. The system of claim 1, wherein the curvature value is a first curvature value, wherein the candidate trajectory is associated with the first curvature value, and wherein the instructions, when executed by the one or more processors, further program the one or more processors to:

determine one or more first costs associated with the candidate trajectory;

determine the output trajectory based at least in part on a second curvature value that is different than the first curvature value;

determine one or more second costs associated with the output trajectory;

determine a cost difference between the one or more first costs and the one or more second costs;

determine that the cost difference is below a threshold value; and output the output trajectory to the vehicle controller to control the autonomous vehicle based at least in part on the cost difference being below the threshold value.

6. The system of claim 1, wherein the candidate trajectory is a first candidate trajectory associated with a first action, and wherein the instructions, when executed by the one or more processors, further program the one or more processors to:

determine one or more first costs associated with the first candidate trajectory;

determine a second candidate trajectory associated with a second action;

determine one or more second costs associated with the second candidate trajectory;

select, as a selected action, the first action or the second action based at least in part on the one or more first costs and the one or more second costs; and output the selected action to a vehicle controller to control the autonomous vehicle.

7. The system of claim 1, wherein the state of the autonomous vehicle further includes at least:

a velocity of the autonomous vehicle;

a steering angle;

a lateral offset; and an angular offset.

8. The system of claim 1, wherein:

the tangent vector is a first tangent vector;

the reference line is a first reference line;

the segment is a first segment; and the instructions, when executed by the one or more processors, further program the one or more processors to:

determine a third frame associated with the reference trajectory, the third frame associated with a second tangent vector associated with a third point on the reference trajectory; and determine a second segment of the candidate trajectory having an origin associated with the intersection point and intersecting with a second reference line that is substantially perpendicular to the second tangent vector associated with the third point.

9. The system of claim 1, wherein:

the candidate trajectory includes a plurality of segments, a number of the plurality of segments based at least in part on one or more of a time period, a length, or a curvature, and the instructions, when executed by the one or more processors, further program the one or more processors to:

adjust one or more curvature values associated with the plurality of segments based at least in part on one or more costs associated with the candidate trajectory.

10. A method comprising:

determining a reference trajectory for an autonomous vehicle to traverse an environment;

determining one or more frames associated with the reference trajectory, the one or more frames associated with locations along the reference trajectory;

determining an initial state of the autonomous vehicle, the initial state associated with a first frame of the one or more frames;

determining a reference line based at least in part on a second frame of the one or more frames;

determining, based at least in part on the initial state and the reference line, one or more candidate trajectories; and outputting an output trajectory to a vehicle controller to control the autonomous vehicle, the one or more candidate trajectories including the output trajectory.

11. The method of claim 10, wherein a candidate trajectory of the one or more candidate trajectories includes a plurality of segments, a segment of the plurality of segments associated with a curvature value, the method further comprising:

determining that a first cost associated with the candidate trajectory meets or exceeds a threshold value;

varying, as a revised curvature value, the curvature value of the segment;

determining a revised candidate trajectory based at least in part on the revised curvature value; and determining that a second cost associated with the revised candidate trajectory does not meet or exceed the threshold value.

12. The method of claim 10, wherein a candidate trajectory of the one or more candidate trajectories corresponds to one or more actions, the one or more actions including:

the autonomous vehicle merging to a left lane;

the autonomous vehicle merging to a right lane;

the autonomous vehicle continuing in a current lane; or the autonomous vehicle stopping.

13. The method of claim 10, wherein the one or more candidate trajectories includes a first candidate trajectory, the method further comprising:

determining one or more first costs associated with the first candidate trajectory;

determining a second candidate trajectory of the one or more candidate trajectories;

determining one or more second costs associated with the second candidate trajectory; and selecting, as the output trajectory, the first candidate trajectory or the second candidate trajectory based at least in part on the one or more first costs and the one or more second costs.

14. The method of claim 10, wherein a candidate trajectory of the one or more candidate trajectories includes a segment:

having an origin associated with the initial state; and intersecting with the reference line at an intersection point; and wherein the method further comprises determining a location of the intersection point based at least in part on a curvature value associated with the segment.

15. The method of claim 14, wherein:

the segment is a first segment, the curvature value is a first curvature value, the origin is a first origin, the intersection point is a first intersection point, and the reference line is a first reference line, the method further comprising:

determining a second reference line based at least in part on a third frame of the one or more frames;

determining a second segment of the candidate trajectory, the second segment:
    having a second origin based at least in part on the first intersection point; and
    intersecting with the second reference line at a second intersection point; and
    determining the second intersection point based at least in part on a second curvature value associated with the second segment.

16. The method of claim 10, wherein a number of segments associated with a candidate trajectory of the one or more candidate trajectories is based at least in part on one or more of a first distance, a first time, or a first curvature between the one or more frames and one or more of a second distance or a second time associated with a receding horizon.

17. A non-transitory computer-readable medium storing instructions that, when executed, cause one or more processors to perform operations comprising:
    determining a reference trajectory for an autonomous vehicle to traverse an environment;
    determining one or more frames associated with the reference trajectory, the one or more frames associated with locations along the reference trajectory;
    determining one or more reference lines, the one or more reference lines associated with the one or more frames;
    determining an initial state associated with the autonomous vehicle, the initial state associated with a frame of the one or more frames;
    determining, based at least in part on the initial state and the one or more reference lines, one or more candidate trajectories; and
    outputting an output trajectory to a vehicle controller to control the autonomous vehicle, the one or more candidate trajectories including the output trajectory.

18. The non-transitory computer-readable medium of claim 17, the operations further comprising:
    determining one or more intersection points between the one or more reference lines and the one or more candidate trajectories; and
    determining one or more curvature values associated with the one or more intersection points, wherein a segment of a candidate trajectory of the one or more candidate trajectories is based at least in part on the curvature value.

19. The non-transitory computer-readable medium of claim 17, where the frame is a first frame, the operations further comprising:
    determining a tangent vector associated with a second frame of the one or more frames, wherein a reference line of the one or more reference lines is normal to the tangent vector.

20. The non-transitory computer-readable medium of claim 17, wherein the operations further comprise:
    selecting, as the output trajectory, a candidate trajectory of the one or more candidate trajectories having a lowest cost; and
    determining a command configured to cause the autonomous vehicle to navigate based, at least in part, on the output trajectory.

* * * * *